United States Patent [19]

Frost

[11] 3,923,351

[45] Dec. 2, 1975

[54] INTEGRAL BEARING SEAL

[75] Inventor: Charles C. Frost, Newaygo, Mich.

[73] Assignee: C. L. Frost & Son, Inc., Grand Rapids, Mich.

[22] Filed: Sept. 18, 1973

[21] Appl. No.: 398,374

[52] U.S. Cl. .......... 308/187.1; 308/36.1; 308/187.2
[51] Int. Cl.² .......................................... F16C 1/24
[58] Field of Search............ 308/187.1, 187.2, 36.1

[56] References Cited
UNITED STATES PATENTS

| | | | |
|---|---|---|---|
| 1,580,701 | 4/1926 | Travers | 308/187.1 |
| 2,573,735 | 11/1951 | Sanford | 308/187.1 |
| 3,226,168 | 12/1965 | Recknagel | 308/187.1 |
| 3,245,735 | 4/1966 | Sikora | 308/187.1 |
| 3,345,115 | 10/1967 | Olender | 308/187.1 |
| 3,432,215 | 3/1969 | Seay | 308/187.1 |
| 3,439,963 | 4/1969 | Hein | 308/187.1 |
| 3,531,168 | 9/1970 | Bainard | 308/187.1 |
| 3,608,987 | 9/1971 | Jordan | 308/187.1 |
| 3,614,183 | 10/1971 | Berens | 308/187.1 |
| 3,707,315 | 12/1972 | Goodfellow | 308/187.1 |

*Primary Examiner*—Charles J. Myhre
*Assistant Examiner*—Daniel J. O'Connor
*Attorney, Agent, or Firm*—Price, Heneveld, Huizenga & Cooper

[57] ABSTRACT

A bearing seal for roller, ball or other bearing assemblies having inner and outer races adapted to contact in sealing engagement the side surface of such an assembly and an axle, shaft or bushing extending from the inner race or an inner race extension. The seal includes a rigid metallic portion and a flexible, resilient, wear-resistant portion bonded thereto and having an inner annular lip sealingly engaging the shaft. The rigid portion has an outer diameter less than or equal to the outer diameter but greater than the inner diameter of the outer race and is clamped against the outer race for rotation therewith without applying any clamping force to the flexible portion.

16 Claims, 5 Drawing Figures

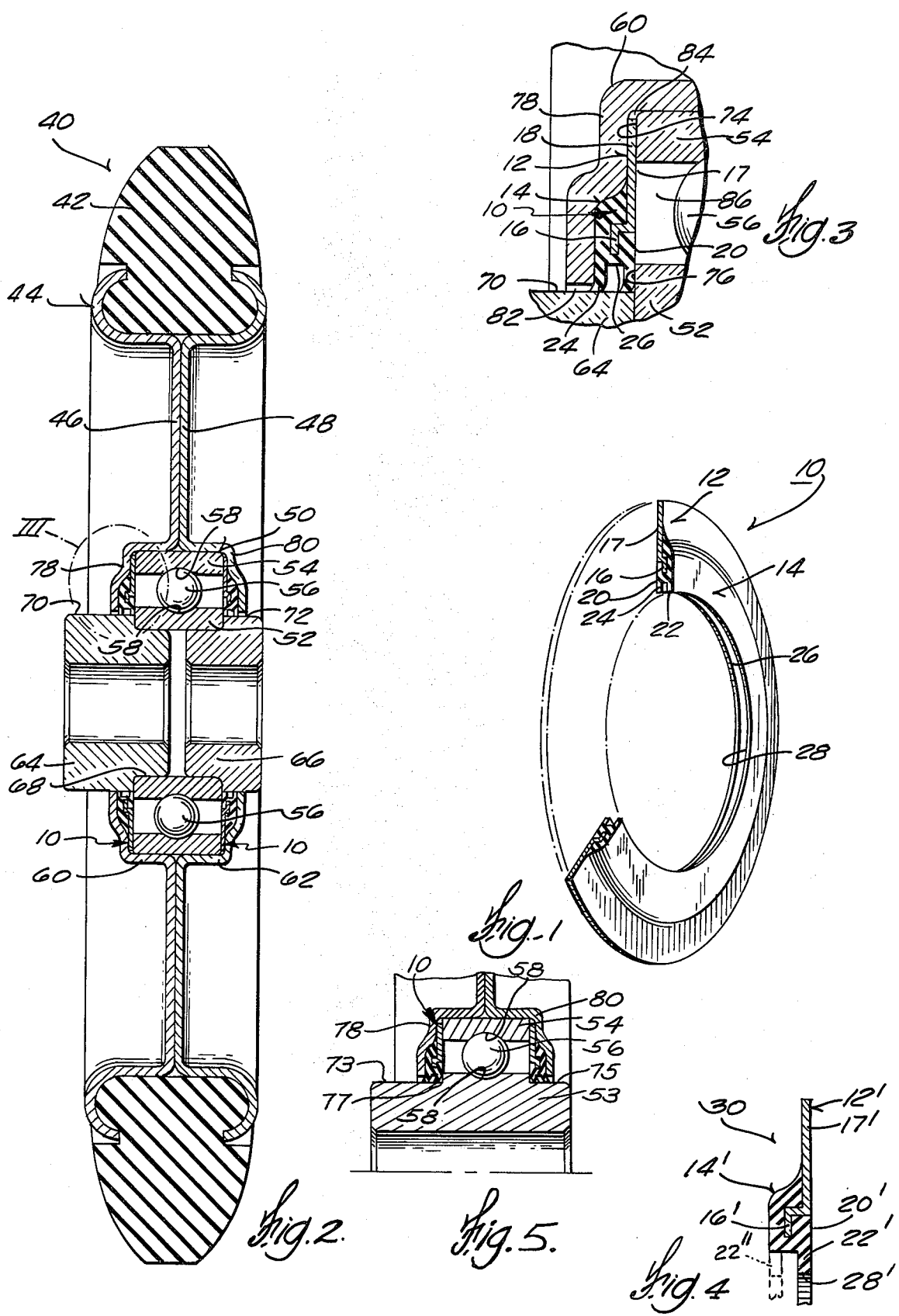

INTEGRAL BEARING SEAL

This invention relates to lubrication seals for bearings and, more particularly, to an outboard, external bearing seal which contact the side surface and supporting shaft or extended inner race of a roller, ball or other bearing unit.

BACKGROUND OF THE INVENTION

Roller, ball, and other bearing units for modern applications are designed for lubrication-free service over their entire service life. The lubrication seals used with such bearings are crucial to their continued operation. In the past, bearing seals for such assemblies have been incorporated directly within the bearing assembly, the seal typically being suitably secured in annular grooves in the inner and outer races. Provision for the insertion of such seals accordingly requires a greater width for the bearing races. This significantly increases the cost of the assembly since the bearing races are made of expensive, highly machineable steel and formed within very close tolerances. Thus, the tooling and assembly costs necessary to manufacture such bearing units has tended to greatly increase the overall cost of these bearing assemblies.

Several attempts have been made to simplify the seal of bearing units and reduce the overall costs involved. One such attempt provides a rotating, resilient washer retained against the side of a ball bearing assembly such that its inner diameter engages an extending portion of the inner race of the bearing while the outer diameter is forced radially towards the inner race as well as being clamped against the side of the bearing by an outer housing or cover or cap. Because the washer is clamped radially toward the inner race as well as against the side of the bearing, it must be manufactured extremely carefully such that the central aperture, through which the inner race extends, is exactly concentric with the outside diameter thereof. Further, the outside diameter must be carefully controlled to be exactly that of the outer race. Accordingly, any eccentricity in the location of the central aperture will prevent the seal from performing properly. Such eccentricity can result from inaccuracies in the formation of either the central aperture or outer diameter.

Yet another significant disadvantage is that the flexible seal itself is clamped to the side of the bearing and thus there is no absolute assurance that even if the seal is precisely manufactured that the clamping force will not improperly distort the seal initially when installed or as the seal wears during operation of the bearing. With such precise manufacturing being necessary and no positive assurance that it will even then perform properly, these types of seals have not solved the problem of simplification and expense involved in manufacturing seals for modern bearing units. Thus, there is a need in this art for an improved bearing seal.

SUMMARY OF THE INVENTION

Accordingly, it is a purpose of the present invention to provide an outboard seal for bearing assemblies which need not be secured within the races of the bearing unit but rather sealingly engages the side surfaces of at least the outer race while rotatably sealingly engaging means extending from one side of the inner race or a shaft extending from the inner race. The seal provides sufficient room between the races and bearing seals for inserting required amounts of grease or other lubricants and may be easily assembled over an extension of the inner race or a shaft supporting the bearing. When slipped over the shaft or extended inner race, the seal is self-centering while the outer circumference thereof extends only to a location generally between the inner and outer diameters of the outer race but not beyond the circumference of the outer race. Accordingly, the need for precision and critical manufacturing tolerances in the bearing seal is effectively eliminated.

In the preferred embodiment, the bearing seal comprises two portions comprising an annular, rigid, metallic portion having an extending flange on its inner diameter to which is bonded a flexible, resilient, wear-resistant and annular member which is molded about the extending flange. The flexible member includes at least one radially inwardly extending, flexible, annular lip which defines a central aperture through the seal. The shaft extending from the inner race or extended inner race is received in the central aperture thereby centering the seal against the bearing unit. When installed in a wheel, pulley or other similar apparatus, a hub extending from the wheel or pulley fits downwardly over the bearing to a position immediately adjacent the shaft or extended inner race and clamps the rigid portion of the seal against the side of the outer race such that the seal and outer race rotate together. Together, the clamping hub and two-part, integral, molded bearing seal effectively prevent the escape of lubricants from the bearing unit and prevent the entry of dirt, dust, and other foreign matter into the seal.

Accordingly, the present outboard bearing seal has several significant advantages over prior known seals. The seal is easily assembled over the extension of the inner race, supporting shaft, or bushings for the bearing assembly. When so assembled, the seal is self-centering and automatically positions its outer rigid portion against the side of the outer race. Accordingly, correspondence and concentricity of the seal lip and the annular sealing surface with the inner race, shaft or bushing is significantly improved. Manufacturing tolerances are therefore noncritical since the outside diameter of the seal need not precisely match the outside diameter of the outer race. Also, the seal will perform effectively even if its central aperture is slightly eccentric or positioned slightly off-center with respect to the outer circumference of the seal. Moreover, the flexible portion of the seal is not clamped against the bearing thereby eliminating distortion of the flexible lip either in assembly or operation of the seal.

These and other objects, advantages, purposes, and features of the invention will become more apparent from a study of the following description taken in conjunction with the drawings.

BRIEF DESCRIPTION OF THE DRAWINGS

FIG. 1 is a perspective view with a portion broken away of the two-part, integral bearing seal of the present invention;

FIG. 2 is a sectional view of a typical wheel assembly including the two-part integral bearing seal of the present assembly;

FIG. 3 is an enlarged sectional view of area III of FIG. 2;

FIG. 4 is a fragmentary, sectional view of a modified embodiment of the two-part, integral bearing seal; and FIG. 5 is a fragmentary, sectional view of a modified wheel assembly including an extended inner race and the present bearing seal.

DESCRIPTION OF THE PREFERRED EMBODIMENT

Referring now to the drawings in greater detail, FIG. 1 illustrates one embodiment 10 of the two-portion bearing seal. Seal 10 includes an annular rigid portion 12 to which is integrally molded and bonded a flexible, resilient, wear-resistant annular portion 14. The rigid member 12 is preferably formed from steel or other similar sturdy and wear-resistant metallic material while the flexible molded portion 14 is preferably formed from black, nitrile rubber or the like. This type of rubber has been found to be superior in this application since it can be bonded to such rigid materials, retains its resiliency at high temperatures, is resistant to oils, greases and other lubricants, and yet is extremely resistant to wear and abrasion.

The bonding of the preferred nitrile rubber to the steel is accomplished with heat during the molding process and is complete on all surfaces about flange 16 and a portion of the outside surface of the rigid member 12.

As is best seen in FIG. 3, the rigid member 12 is substantially planar except for annular flange 16 having the cross-sectional shape of an "L". Flange 16 is formed or stamped integrally to extend generally transverse to the plane of the rigid member from its inner circumference or diameter 15. The generally planar portion 18 adjacent the outer diameter or circumference of rigid member 12 is adapted to be clamped against the side of an outer race of a bearing unit as will be more fully explained below.

The flexible member 14 is molded about the annular, L-shaped flange 16 in a suitable mold such that it joins the outside surface of the rigid member 12 in a radiused transition between the outer portion 18 and the flange 16 on one side of the bearing. The opposite or inner surface 20 thereof is formed substantially co-planar and flush with the inner surface 17 of the rigid member. Accordingly, the greater diameter of the flexible portion 14 is less than the greatest diameter of the rigid member 12.

Molded integrally with the flexible portion 14 in seal 10 are two radially inwardly extending, flexible, annular lips or flanges 22 and 24. Lips 22 and 24 are spaced apart and extend generally parallel to one another and to the plane including the substantially planar portion of the rigid member 12. Flanges 22 and 24 also terminate the same distance from the inner diameter 25 of flexible portion 14 and define a channel 26 therebetween as well as a central circular aperture 28 extending through the seal 10 as a whole. The axis of the circular aperture 28 extends substantially perpendicular to the plane including the co-planar surfaces 17 and 20.

A modified form of the bearing seal 30 is illustrated in FIG. 4. This embodiment is substantially the same as seal 10 and includes a rigid member 12', including annular, L-shaped flange 16' extending from the inner diameter thereof. A flexible portion 14' is molded about and securely bonded to rigid member 12 in the manner described above for seal 10. The primary difference between seals 10 and 30 is that seal 30 includes only one annular, radially inwardly extending, flexible lip 22' which extends from the inside diameter 15' of of flexible member 14' and defines a central aperture 28' extending through the seal 30. As will be understood from FIG. 4, the inside surface 20' of flexible portion 14' and lip 22' is substantially co-planar and flush with the inside surface 17' of rigid member 12'. Although embodiment 30 of the seal is shown as including but one annular lip 22', it will be apparent to those skilled in the art that similar seals including rigid and flexible portions bonded together in the manner described herein could be made including three, four or more lips as desired. Also, lip 22' need not have a surface flush with surface 20'. Lip 22' could be located anywhere along the width of flexible member 14' as shown by the lip 22" shown in phantom in FIG. 4.

Referring now to FIG. 2, the assembly of either of the embodiments 10 or 30 of the present bearing seal is illustrated in a typical wheel assembly 40. As depicted therein, assembly 40 includes a solid rubber tire 42 retained on a stamped hub 44 including left and right hub portions 46 and 48, respectively. Rotatably supporting the hub 44 is a bearing unit or assembly 50 including an inner race 52, an outer race 54, and a plurality of ball bearings 56 disposed for rotational movement in rounded grooves or channels 58 on the inside surfaces of the races. The outer circumference of the outer race 54 supports the hub 44 thereon via left and right stamped bearing housings 60 and 62 which are integral with hub portions 46 and 48 and which together define a space in which the bearing is seated. Bushings, axles, or shafts 64 and 66 are press fitted into the central aperture 68 formed by the inner diameter of inner race 52. Shafts 64 and 66 each include outer, annular, cylindrical surfaces 70 and 72, respectively, adjacent the sides of the inner race as is seen in FIG. 4. The inner race may also be extended as at 53 in FIG. 5 beyond the plane including the side surface of outer race 54 to provide annular surfaces 73 and 75 for engagement by annular lip or lips 22, 24 or 22'. In such a case, the seal would not engage any portion of a supporting shaft, bushing, or axle.

As is seen in FIGS. 3 and 4, either of the bearing seals 10 or 30 is slipped over the shafts 64 or 66 on both sides of the bearing unit 50 such that the shafts are received in central apertures 28 or 28'. The diameter of cylindrical surfaces 70 and 72 is slightly larger than the diameter of apertures 28 and 28' such that the lips 22 and 24 or 22' tightly mate against the cylindrical surfaces and stably support and center the seals thereon. The seals 10 or 30 are pushed tightly against the generally co-planar side surfaces 74 and 76 of the inner and outer races such that the generally co-planar surfaces 17 and 20 or 17' and 20' of the seals fit flush thereagainst. Stamped annular portions 78 and 80 of hub housings 60 and 62 then clamp the outer portions 18 or 18' of the seals 10 or 30 tightly against the side 74 of the outer race such that the seals rotate with the outer race about the stationary shaft and/or inner race. In other applications, when the outer race is held stationary, the inner race rotates with respect to the seal and outer race. The remainders 79 and 81 of either of the hub housings 60 and 62 are contoured to fit the radiused shape of the flexible portion 14 but do not clamp that portion against the side 76 of inner race 62. Thus, lips 22, 22', as well as lip 24, may flex slightly away from side 76 of inner race 52 or away from shoulder 77 on the extended inner race 53 without affecting performance of the seal (see FIGS. 3 and 5). The ends of the hub housings 60 and 62 extend to a position immediately adjacent the cylindrical surfaces 70 and 72 (see FIG. 3) such that a small space 82 is left therebetween allowing the rotation of the shaft. This acts as a shield for the bearing. In the actual assembly operation, the seals are received over the shafts, and the bearing unit 50 and seals 10 or 30 together are received in either half 46 or 48 of the hub 44. Thereafter, the remaining portion of the hub is fitted over the opposite side of the bearing assembly and welded, riveted or otherwise secured to the opposing hub half.

As will be understood from FIG. 3, the outer diameter of the rigid portion 18 of bearing 10 or 30 is no greater than the outer diameter of the outer race 54 but is greater than the inside diameter of that outer race. Normally, the outside diameter of the seal is less than the outside diameter of the outer race resulting in a space 84 between the inside surface of the hub housing 60 and the outer periphery of the bearing 10 or 30. Accordingly, the hub 60 does not force the bearing seal radially against the cylindrical surfaces 70 and 72 of shafts 64 and 66 or extended inner race and does not distort the flexible portion or annular lip or lips. Rather, the assembly of the seals over the shaft or extended inner race automatically centers the seal and locates its outer periphery between the inner and outer diameters of the outer race. Thereafter, when the hubs are assembled in place, the annular portion 78 of hub housing 60 clamps the outer rigid portion 18 of the seal against the side surface 74 of the outer race. As above, this clamping action causes the bearing to rotate with the outer race thereby providing a more effective seal between the bearing and the outer race where centrifugal force on the lubricants contained in space 86 between the ball bearing and the seal is greatest during rotation of the wheel assembly. Further, the remaining portions 79 and 81 of the hub housings tend to hold lips 22, 24, or 22' in sealing contact with shafts 64 and 66 or extended inner race 53 without tightly clamping lips 22 or 22' against the side of the inner race.

As will now be appreciated, the present inventive two-portion bearing seal provides an effective self-centering seal which is outboard of the bearing unit itself. The clamping of the outer portion of the rigid member against the side of the outer race forms an effective seal therebetween while the flexible, resilient, annular lip or lips form an effective rotating seal about the cylindrical surface of the supporting shaft or bushing. When the seal 10 including two lips is used, the double lip provides a double seal against the escape of lubricants and the entry of foreign matter. Further, the stamped hub housing 60 which clamps the rigid member against the outer race extends downwardly over substantially all of the bearing seal thereby providing an additional barrier against the entry of foreign matter. Accordingly, great care and precision need not be taken during manufacture of the present inventive seals since variations in the outer diameter of the rigid portion or eccentricity in the location of the central aperture through the seal will not prevent proper sealing operation of either the annular lip against the shaft supporting the bearing assembly or extended inner race or the outer rigid portion 18 against the side of the outer race.

While several forms of the invention have been shown and described, other forms will now be apparent to those skilled in the art. Therefore, it will be understood that the embodiments shown in the drawings and described above are merely for illustrative purposes, and are not intended to limit the scope of the invention which is defined by the claims which follow.

The embodiments of the invention in which an exclusive property or privilege is claimed are defined as follows:

1. In a pulley or the like having a bearing assembly including an inner and outer race, said races each having side surfaces and predetermined inner and outer diameters, bearing means interposed between said races for rotational support of one race with respect to the other, means extending beyond the side surface of the outer race on at least one side of the inner race, said means having at least one annular surface thereon, said pulley including an annular hub securing the bearing assembly therebetween such that the pulley and said outer face is rotatably supported with respect to said inner race, said hub having portions in juxtaposition with the sides of said bearing, the improvement comprising: a bearing seal comprising a rigid annular portion disposed between one of the hub portions and the side of said bearing unit toward which said means extends; said bearing seal also having an annular, flexible means affixed to said rigid annular portion in sealing engagement with said annular portion of said extending means, said seal having an outside diameter greater than the inside diameter of said outer race but less than the outside diameter of said outer race; said one hub portion clamping said rigid portion of said seal adjacent the side of said bearing in sealing engagement with the side surface of said outer race on said one side of said bearing unit such that said outer race, hub and bearing seal rotate relative said inner race.

2. The bearing assembly of claim 1 wherein said bearing seal includes an annular rigid member and an annular flexible, wear-resistant member bonded thereto; said rigid member having a diameter greater than that of said flexible member.

3. The bearing assembly of claim 2 wherein said flexible member of said bearing seal includes an annular, flexible lip extending therefrom and defining a central circular aperture therethrough receiving said extending means.

4. The bearing assembly of claim 2 wherein said flexible member includes a plurality of annular, flexible lips extending therefrom and each being in sealing engagement with said extending means; said rigid member including a sealing portion which lies substantially in one plane; said lips lying in planes which are each spaced from one another but are parallel or coplanar to said plane including said sealing portion of said rigid member; one of said lips engaging said inner race and said lips together defining a circular aperture extending centrally through said flexible member which receives said extending means.

5. The bearing assembly of claim 2 wherein said rigid member has an inner diameter and includes an annular flange having an L-shaped cross section extending around said inner diameter; said flexible member being molded about said flange and bonded securely thereto.

6. The bearing assembly of claim 5 wherein said rigid member is formed from steel and said flexible, wear-resistant member is formed from nitrile rubber bonded to said steel during a molding process.

7. The bearing assembly of claim 2 wherein said rigid and flexible members include co-planar surfaces along at least one side of said bearing seal; said one side lying substantially in one plane; said side surfaces on said inner and outer races one side of said bearing unit also being at least substantially co-planar; at least a portion of said substantially planar side of aid bearing seal being clamped in sealing engagement against said co-planar sides of said races.

8. The bearing assembly of claim 2 wherein said one hub portion is annular and clamps said annular rigid portion against the side surface of said outer race and said flexible portion against said inner race.

9. The bearing assembly of claim 1 wherein said hub extends over said bearing seal in engagement with both said seal portions to a position immediately adjacent said extending means; said hub providing a positive shield and retention for said bearing unit.

10. The assembly according to claim 1 wherein said bearing seal engages both said inner and outer races and is positioned intermediate said hub portion clamping said bearing seal and said inner and outer races.

11. A bearing assembly for rotatably supporting wheels, pulleys, and the like, said assembly including a bearing unit having inner and outer races with bearing means disposed therebetween for rotational support of one race with respect to the other, said races each having side surfaces and predetermined inner and outer diameters; clamping means extending radially alongside said outer race and means including an annular, circumferential surface thereon extending beyond one side of the outer race on one side of said inner race; a bearing seal fitted over said extending means in sealing engagement with at least one side surface of said outer race and said annular, circumferential surface; said bearing seal including an outer, rigid, annular member having a diameter greater than the inner diameter of said outer race and less than the outer diameter of said outer race, said rigid member being clamped between said clamping means and outer race and an annular, flexible, resilient, wear-resistant member bonded radially inwardly and to a portion of said rigid member; said flexible member having an annular lip molded integrally with and radially inwardly of said flexible member, said lip defining a central aperture through said seal which receives said annular, circumferential means.

12. The bearing assembly of claim 16 wherein said rigid member is clamped in sealing engagement with one side surface of said outer race and said flexible member engages the similar side of said inner race.

13. A bearing assembly for rotatably supporting wheels, pulleys, and the like, said assembly including a bearing unit having inner and outer races with anti-friction means disposed therebetween for rotational support of one race with respect to the other, said races each having side surfaces and predetermined inner and outer diameters; a bearing seal in sealing engagement with at least one side surface of both said outer and inner race; said bearing seal including a rigid, annular member having a diameter greater than the inner diameter of said outer race and less than the outer diameter of said outer race; clamping means for clamping said rigid member in positive sealing abutment against the one said side surface of said outer race; and an annular, flexible, resilient, wear-resistant member bonded radially inwardly to said rigid member; said flexible member extending radially inwardly from said rigid member into sealing engagement with said inner race, said clamping means, outer race and bearing seal rotating relative said inner race.

14. The bearing seal of claim 13 wherein one side of said seal is a substantially planar surface formed from substantially co-planar surfaces of said flexible and rigid members.

15. The bearing seal of claim 13 wherein said rigid member has an inner diameter; said flange means comprising an annular flange having an L-shaped cross-section formed integrally from and extending about said inner diameter of said rigid member.

16. The bearing seal of claim 13 wherein said rigid member is formed from steel and said flexible, resilient, wear-resistant member is formed from nitrile rubber bonded to said steel during a molding process.

* * * * *

UNITED STATES PATENT AND TRADEMARK OFFICE
CERTIFICATE OF CORRECTION

PATENT NO. : 3,923,351
DATED : December 2, 1975
INVENTOR(S) : Charles C. Frost

It is certified that error appears in the above-identified patent and that said Letters Patent are hereby corrected as shown below:

Column 3, line 42;

"greater" should be --greatest--;

Column 3, line 67;

"of of" should be --of--;

Column 4, line 28;

After "bearing" insert --unit--;

Column 6, line 17, Claim 1;

"face" should be --race--;

Column 7, line 4, Claim 7;

"aid" should be --said--;

Column 8, line 1, Claim 12;

"16" should be --11--.

Signed and Sealed this twentieth Day of April 1976

[SEAL]

Attest:

RUTH C. MASON
Attesting Officer

C. MARSHALL DANN
Commissioner of Patents and Trademarks